United States Patent
Neitsch et al.

(10) Patent No.: US 10,094,712 B2
(45) Date of Patent: Oct. 9, 2018

(54) METHOD FOR COMPENSATING A SPECTRUM DRIFT IN A SPECTROMETER

(71) Applicant: Spectro Analytical Instruments GmbH, Kleve (DE)

(72) Inventors: Lutz Neitsch, Hamminkeln (DE); Markus Neienhuis, Kleve (DE)

(73) Assignee: Spectro Analytical Instruments GmbH, Kleve (DE)

( * ) Notice: Subject to any disclaimer, the term of this patent is extended or adjusted under 35 U.S.C. 154(b) by 0 days.

(21) Appl. No.: 15/807,925

(22) Filed: Nov. 9, 2017

(65) Prior Publication Data

US 2018/0128679 A1 May 10, 2018

(30) Foreign Application Priority Data

Nov. 9, 2016 (DE) .......................... 10 2016 013 267

(51) Int. Cl.
  *G01J 3/28* (2006.01)
  *G01J 3/02* (2006.01)
  *G01J 3/443* (2006.01)

(52) U.S. Cl.
  CPC ........... *G01J 3/0286* (2013.01); *G01J 3/2803* (2013.01); *G01J 3/443* (2013.01); *G01J 2003/2813* (2013.01)

(58) Field of Classification Search
  CPC .... G01J 3/02; G01J 3/28; G01J 3/2803; G01J 3/10; G01J 3/2823
  USPC ........................................................ 356/326
  See application file for complete search history.

(56) References Cited

U.S. PATENT DOCUMENTS

| | | | | |
|---|---|---|---|---|
| 4,932,779 | A * | 6/1990 | Keane | G01J 3/0251 250/228 |
| 7,359,060 | B2 * | 4/2008 | Ebersole | G01N 21/31 356/451 |
| 9,841,322 | B1 * | 12/2017 | Kemeny | G01J 3/0272 |
| 2009/0284739 | A1 * | 11/2009 | Denney | B23K 26/03 356/318 |

* cited by examiner

*Primary Examiner* — Md M Rahman
(74) *Attorney, Agent, or Firm* — Panitch Schwarze Belisario & Nadel LLP

(57) ABSTRACT

A method for compensating spectrum drift in a spectrometer having a radiation source, optical apparatus to split up a spectrum into spectral lines according to wavelengths of radiation from the radiation source, a number of detectors to receive partial spectra, and which are provided with respective pluralities of pixels to measure radiation intensity, and a catalog of spectral lines of different chemical elements that may be used as correction lines. The method may include generating and recording an emission spectrum of a sample; determining pixels receiving the maximum of the peaks for respective partial spectra and identifying respective peak positions for the peak maxima; for the respective peak positions, determining if there is a correction line within a predetermined maximum distance from the peak position, and if so, calculating a distance between the peak position and the correction line; and calculating a correction function for assignment of peak positions.

3 Claims, 6 Drawing Sheets

METHOD FOR COMPENSATING A SPECTRUM DRIFT IN A SPECTROMETER

The present invention relates to a method for compensating a spectrum drift in a spectrometer.

Figure 10:
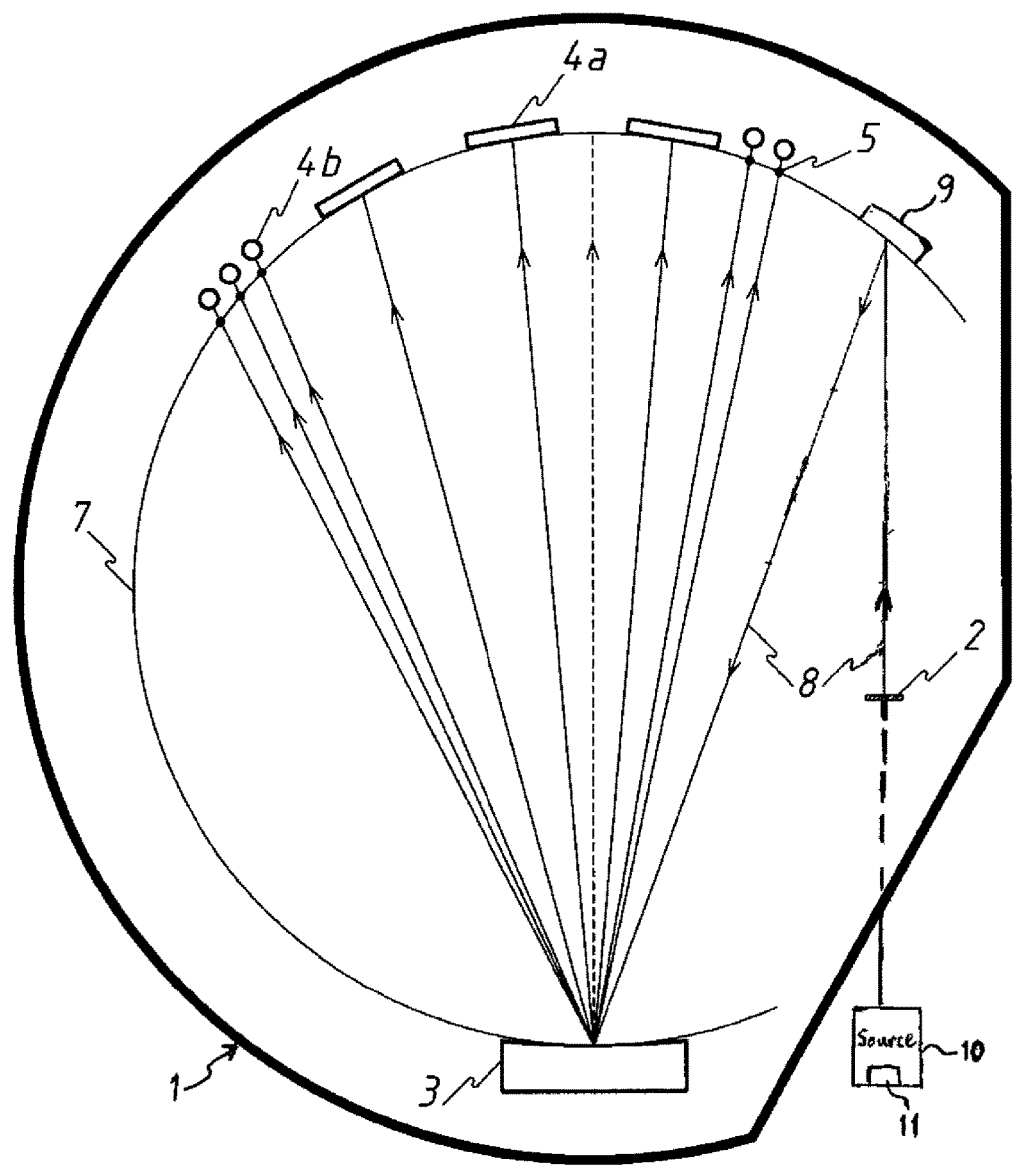

Spectral information is recorded and evaluated using spectrometers to quantitatively analyse element contents, for example. An example of a known optical spectrometer 1 is shown in FIG. 10. In optical spectroscopy, a sample 11 is excited in a source 10 to emit radiation in the wavelength range from ultraviolet to infrared. In the example of FIG. 10, the radiation passes through an entrance slit 2 and may pass to a reflective element 9; note that reflective element 9 is shown on the periphery 7 of a Paschen-Runge/Rowland circle-type of spectrometer, but reflective element 9 may be located elsewhere along an optical path 8. It is further noted that other configurations of an optical spectrometer are known (e.g., there are examples in which the reflective element 9 may be omitted, and radiation may be directed directly to a dispersive element). Reflective element 9 may direct the radiation to a dispersive element 3. The radiation is then split up, by the dispersive element 3, in an optical apparatus according to wavelength and guided to various detectors 4a, 4b, which may be via exit slits 5, where the various detectors 4a, 4b measure the intensity of the radiation for individual or all wavelengths of the spectrum. The element contents of the sample are calculated from the intensity of the individual wavelengths, which are displayed as lines in the spectrum and are characteristic in each case for a chemical element.

For a quantitative measurement, the position of the spectral lines on the detectors must be precisely known in order to clearly assign a signal measured there to a chemical element. Additionally, the ratio between the measured intensity of the spectral lines and the proportion of the chemical element in the sample must be known.

Spectrometers that can do this are known e.g. from publications DE 19853754 A1 and DE 10 2005 057919 A1.

The effect of the position of the spectral lines changing on the position-resolving detector due to temperature changes, for example is designated as a spectrum drift. When CCD line detectors are used, which are frequently used at present, it is determined during a base calibration which wavelengths are displayed on which pixels of the detector. This assignment may change for a spectrum drift such that the actual position of a line of a determined wavelength is a few pixels apart from the position determined in the base calibration.

A spectrometer is known from the publication DE 10 2010 000490 A1 in which changes in length caused by temperature that produce a defocusing of the beam path in the spectrometer are mechanically compensated. However, this device does not compensate a thermally-induced spectrum drift since this can also occur with correct focussing on the detector, for example by thermal contraction or expansion of the detector itself. This is illustrated by the following observation: If the position of a part of an emission spectrum is viewed on a CCD line detector, then a clear assignment of the wavelengths to the pixels of the sensor is present in the base calibration. In the case of a corresponding mechanical construction of the spectrometer, the position of the spectrum falling on the sensor remains the same due to temperature increase. However, the sensor itself elongates in its longitudinal direction such that the centre remains at the provided location, but the edge-side pixels are moved away from the centre. The pixels thus migrate away from the centre under the spectrum. In the measured spectrum, this looks as though the spectral lines shift towards the centre, i.e. are no longer measured on the provided pixel, but rather on a pixel located beside it, which is arranged further towards the centre of the sensor. When the sensor is cooled, the opposite effect occurs, the sensor contracts under the spectrum and the lines seemingly migrate outwards away from the centre on the detector. This is only one example for a temperature-induced spectrum drift, other influences and configurations are also conceivable. The base calibration, which is carried out at a fixed temperature, cannot compensate for this effect.

It is therefore an object of the present invention to provide a method for compensating the spectrum drift which can be carried out in addition to the base calibration. It is in particular an object of the invention to provide such a method that makes possible a compensation of the spectrum drift during an ongoing measurement.

This object is achieved by a method with the features described in the accompanying claims.

During operation, the advantages emerge whereby the method can be carried out during the measuring operation without separate correction measurements or calibrations being required, no hardware changes or additional hardware components being required and data of the base calibration and the currently measured, unknown sample are sufficient to carry out the correction. Drift changes during the ongoing operation are also recorded and corrected.

This is achieved by the following steps being provided in the operation of an optical spectrometer having a radiation source, which generates characteristic radiation of the chemical elements of an excited sample, having an optical apparatus, which splits up a spectrum into spectral lines according to wavelengths from the radiation, having a number of detectors, which in each case receive a partial spectrum and which are in each case provided with a plurality of pixels to measure the radiation intensity of the partial spectrum falling on the detectors and having a catalogue of spectral lines of different chemical elements which can be used as correction lines:

generating and recording an emission spectrum of a sample;

determining the pixels which receive the maximum of the peaks for each partial spectrum and identifying in each case a peak position for the peak maximums of the partial spectrums;

For each peak position of the partial spectrums: checking whether a correction line is present within a predefined maximum distance from the respective peak position and if so, calculating the distance of the peak position of the measured spectrum from the peak position of the adjacent correction line;

calculating a correction function for the assignment of the peak positions of the partial spectrums to the wavelengths of the measured emission spectrum.

The catalogue of spectral lines is preferably created by means of the following steps:

carrying out a base calibration for the assignment of wavelengths of the radiation, contained in peaks, of a plurality of chemical elements to pixels of the detectors;

determining the pixels which receive the maximum of the peaks for each partial spectrum;

identifying in each case a peak position for the peak maximums of the partial spectrums;

creating a correction line catalogue by selecting and storing peaks that have a minimum distance from adjacent peaks and which are symmetrical to the peak position within a predefined limit. Correction lines are thus determined from the data of the base calibration. The correction lines are substantially independent of the samples used and also of the spectrometer on which the base calibration has been carried out. The correction line catalogue created in this way can at least be transferred to structurally-identical spectrometers.

A correction with improved accuracy is possible when at least three, preferably at least five correction lines are stored in the catalogue for each detector. Particularly good results can be achieved when at least fifteen correction lines are stored in the catalogue for each detector.

The correction process is further improved when a check for outliers is carried out on the identified distances of the peak positions of the measured spectrum from the peak positions of the adjacent correction lines and outliers do not enter into the calculation of the correction function.

Since each detector can exhibit its own drift behaviour, a specific correction function is preferably calculated for each detector. Due the count of correction lines, consideration of position dependent drifts are also considered within the correction function.

An exemplary embodiment is described below by means of the drawing.

Figure 1:
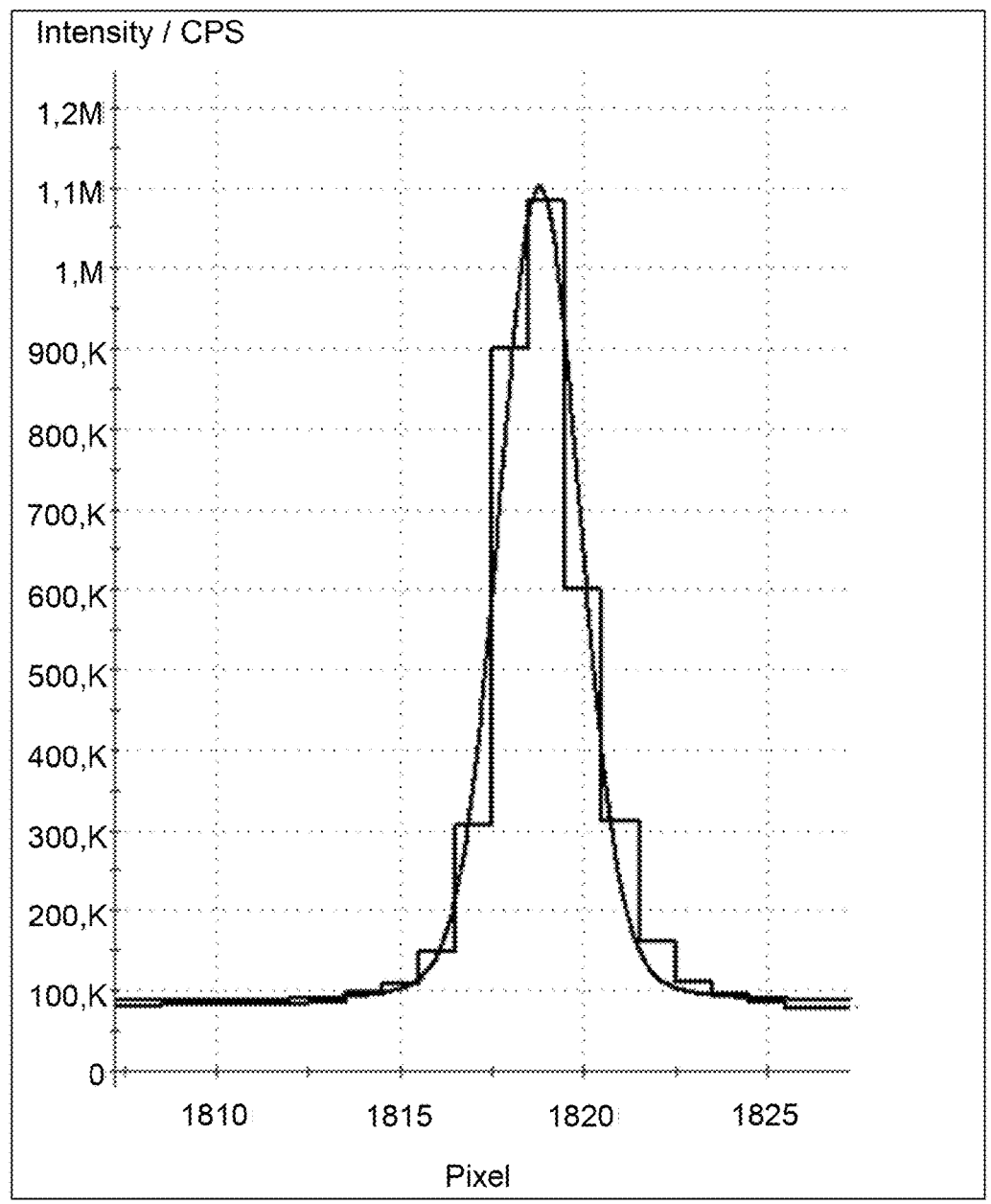
Figure 2:
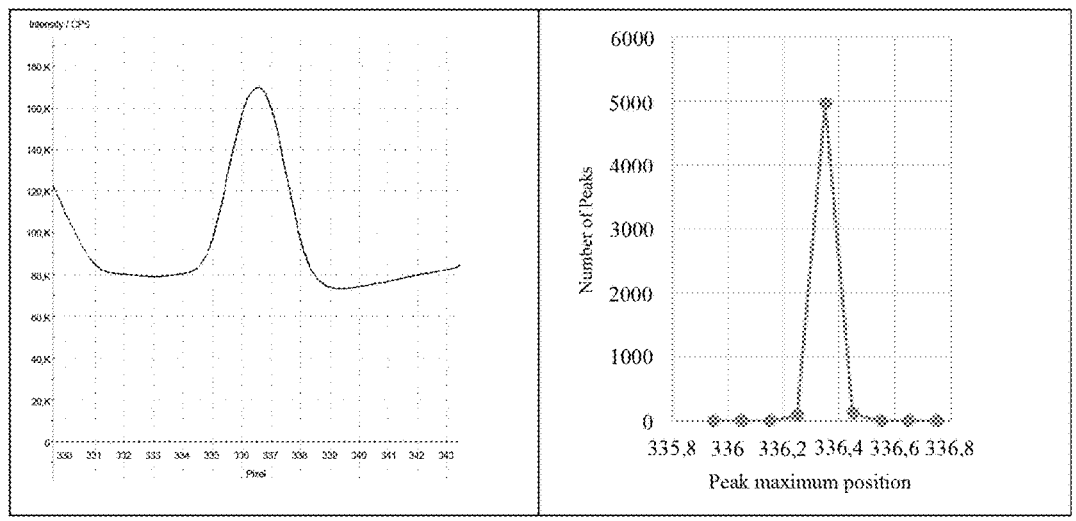
Figure 3:
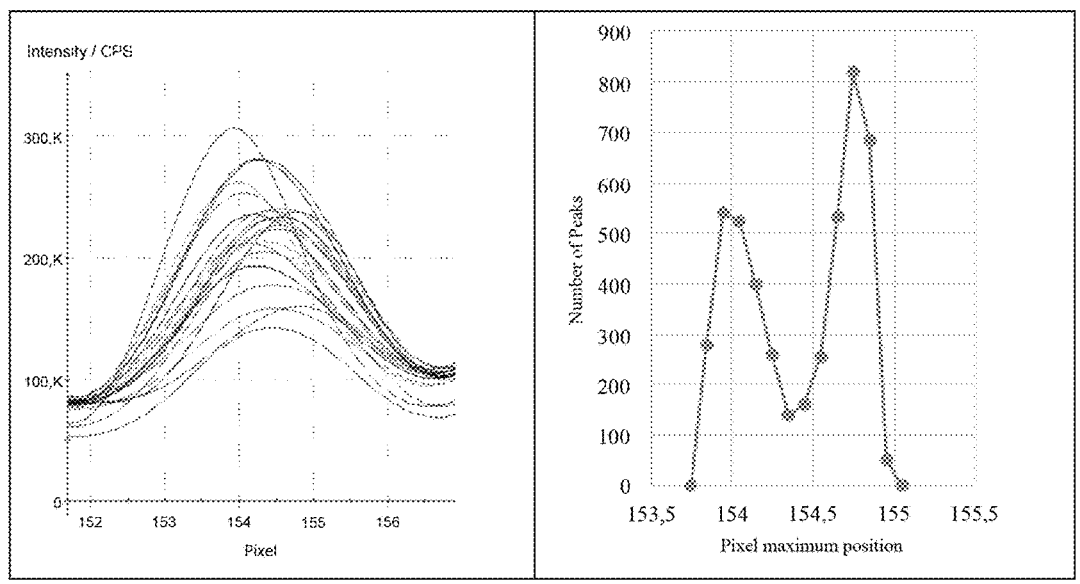
Figure 4:
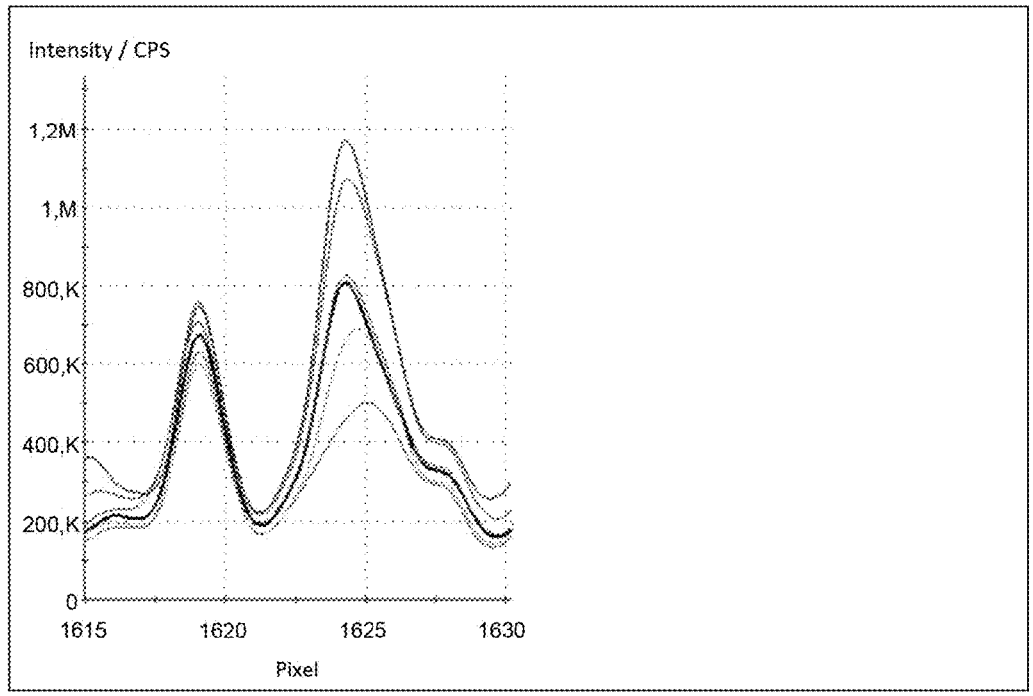
Figure 5:
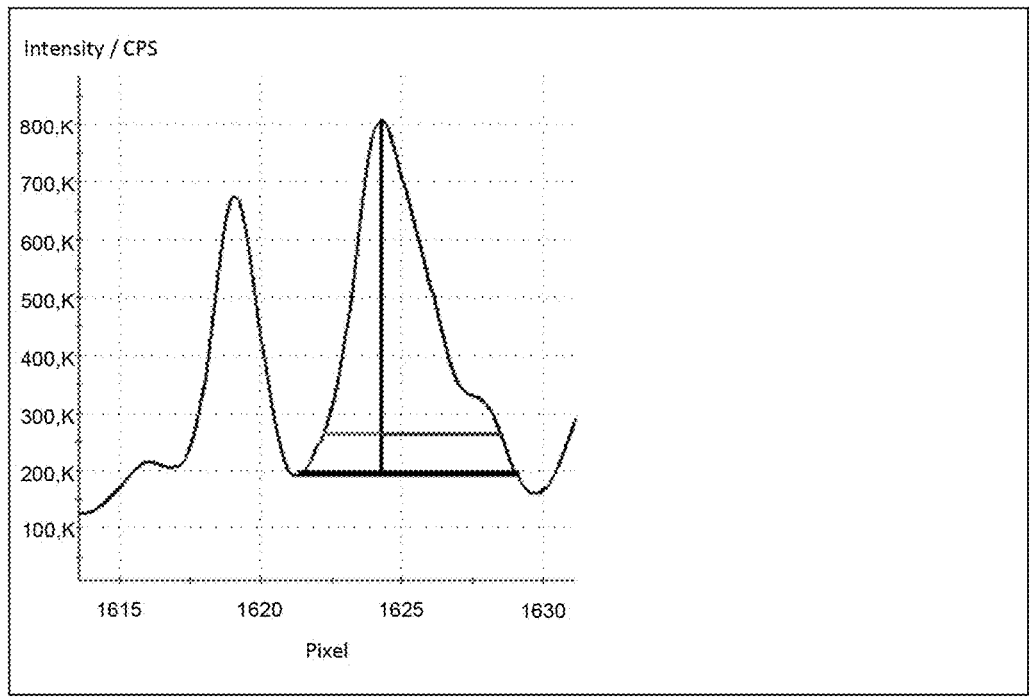
Figure 6:
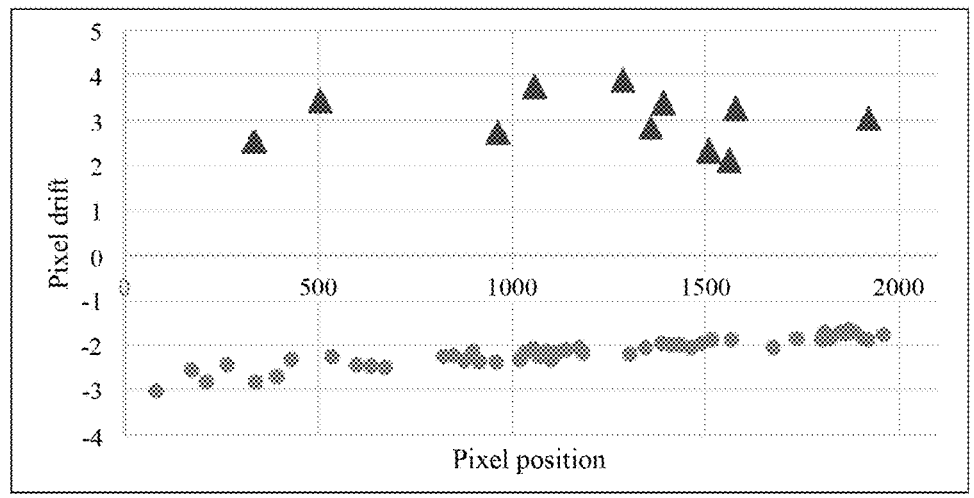
Figure 7:
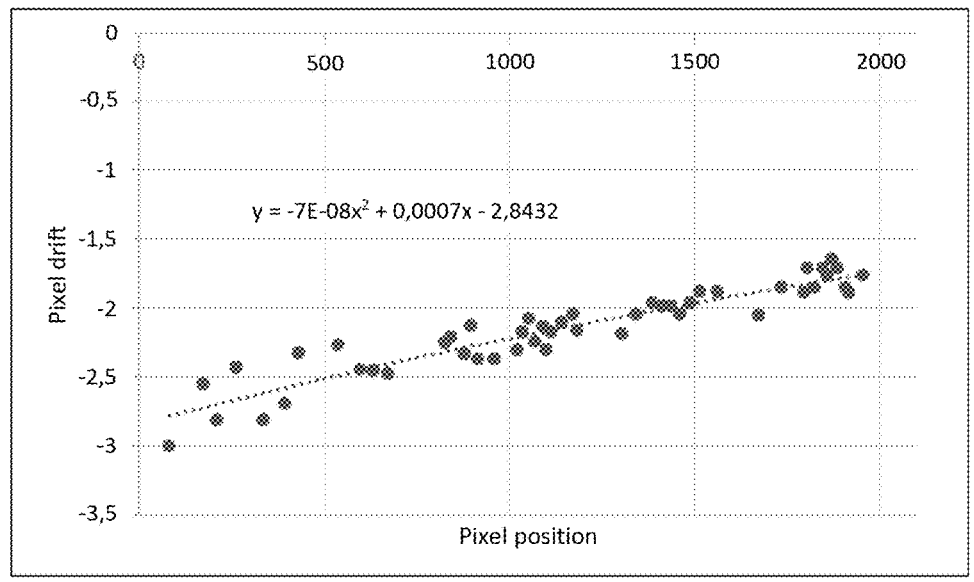
Figure 8:
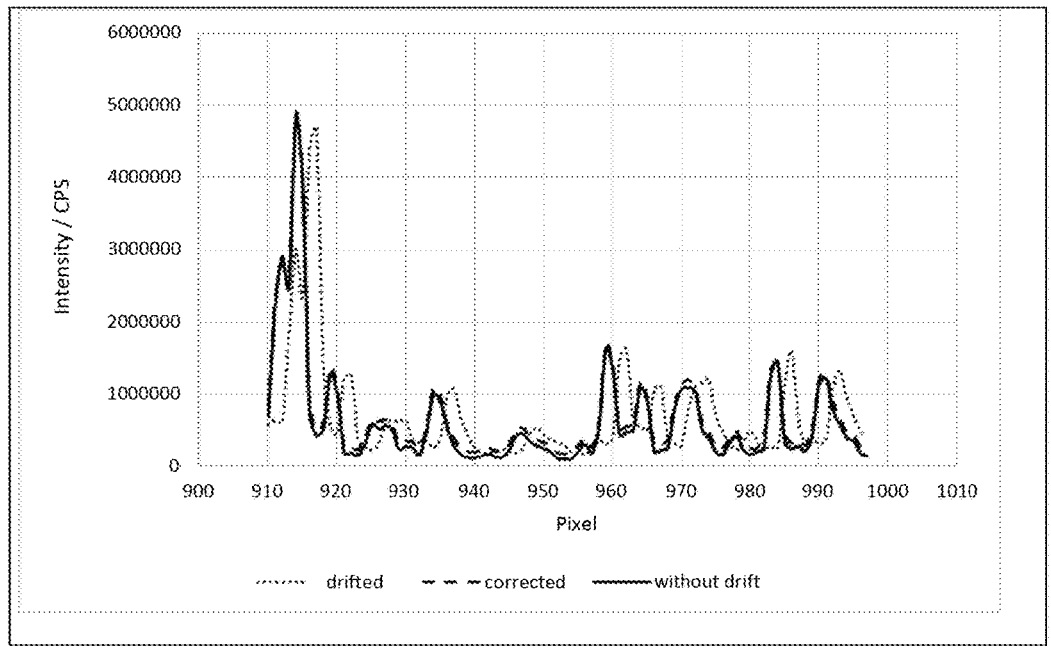
Figure 9:
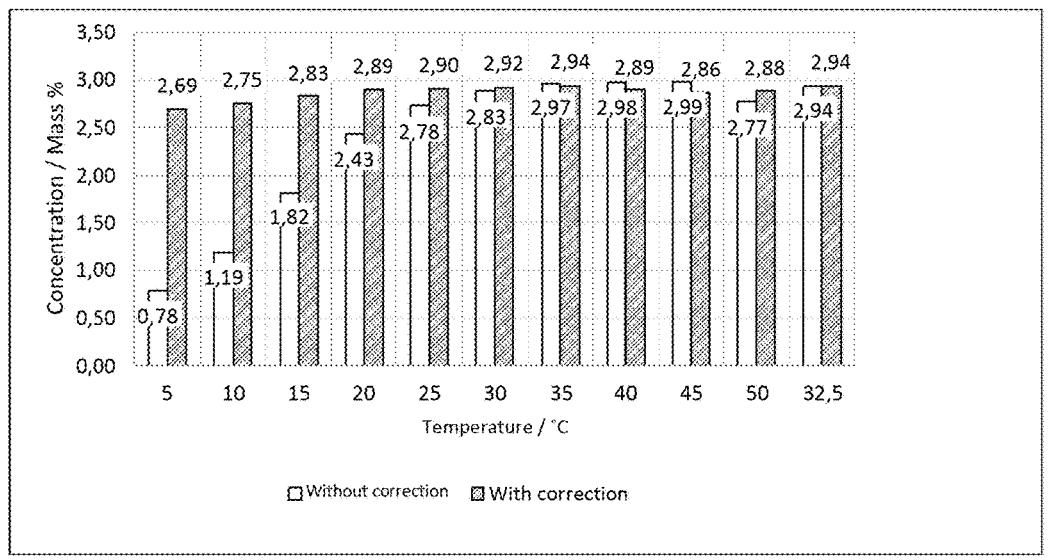

FIG. 1: shows an example of a peak adaption and determination of the subpixel position of a suitable peak by adapting the pixel intensities to a predefined profile;

FIG. 2: shows an example of a spectral range with an exemplary spectrum which is suitable for a drift correction;

FIG. 3: shows an example of a spectral range with exemplary spectrums which are not suitable for a drift correction due to spectral overlaps;

FIG. 4: shows examples of asymmetric peaks at pixel position 1625 which arise due to spectral interference of adjacent peaks;

FIG. 5: shows an illustration of the symmetry determination of a peak;

FIG. 6: shows a representation of the pixel drifts found for assigned catalogue lines from a measured analysis spectrum of an iron sample;

FIG. 7: shows a representation of the position dependent pixel drift to the positions at which lines of the reference catalogue could be assigned to peaks in the measured spectrum of an iron sample;

FIG. 8: shows a representation of the drift correction;

FIG. 9: shows a comparison of concentration determinations of the chrome line at 313.2 nm of an iron sample without and with drift correction in a temperature range of 5° C.-50° C.; and FIG. 10: shows an example of an optical spectrometer in which techniques described herein may be applied.

It will initially be explained how the calibration and measurement is carried out in a spectrometer with pixel-based detectors, e.g., as shown in FIG. 10. As an example, a spectrometer will be described with a grating in a Rowland arrangement 7. The corresponding terminology used in this field will be introduced, with the example of FIG. 10 being referred to in this discussion.

In a spectrometer 1 of this type, an excitation source 10 is used which generates the characteristic radiation of the chemical elements contained in a sample 11. The radiation enters through a gap 2 in the optical apparatus and is broken down by a grating (dispersive element 3) according to the wavelength and is focussed on the focal circle 7. The different wavelengths occur as images of the gap and accordingly look linear. Pixel-based line detectors are arranged on the focal circle of the spectrometer for the electronic recording of the intensities of the lines. Such a detector has for example between 2000 and 8000 pixels in a linear, line-shaped arrangement. Each individual pixel of the detector records the photons arriving there. Either the entire number of photons is counted when less intensity is available, or the counting rate is recorded in counts per second. The latter case will be described here.

In a representation like in FIG. 1, the spectrum can then be represented as a histogram in which the advancing pixel numbers of the detector are plotted on the x-axis and the counting rate, for example in counts per second (cps) is plotted on the y-axis. During calibration, a mathematical function is then applied through the step-shaped peaks occurring in this manner, said mathematical function reflects the usual form of the peak occurring on the focal circle. The maximum of this function is then assigned to a subpixel which results by way of calculation.

FIG. 1 shows an example of a peak adaption and determination of the subpixel position of a suitable peak by adapting the pixel intensities to a predefined profile. The subpixel position is 1818.8 pixels in this example.

An example of a spectral range with an exemplary spectrum is illustrated in FIG. 2 which is suitable for a drift correction. In order to provide greater clarity of the peak maximum, the pixel intensities have been approximated by a cubic spline with a grid of 0.1 pixels. The right illustration in FIG. 2 shows the histogram of the peak for this range. The peak is 336.35 pixels at the peak maximum position. This representation is simplified for greater clarity. In reality, a number of spectrums from the base calibration have to be evaluated for this wavelength range. The peak maximum positions of the individual spectrums are distributed in this case by +/−0.3 pixels symmetrically around the illustrated peak position. A peak determined in this manner is suitable as a correction line for the drift correction.

FIG. 3 shows an example of a spectral range with exemplary spectrums which are not suitable for a drift correction due to spectral overlaps. In order to provide greater clarity of the peak maximum, the pixel intensities have been approximated by a cubic spline with a grid of 0.1 pixels. The right illustration shows the histogram of the peak maximums of all spectrums for this range with the expression of a second frequency maximum towards smaller pixel numbers. The peak at pixel position 154.75 is not suitable as a drift correction peak. In this case, only 54% of all peaks are in a range of +−0.3 pixels from the most frequent peak maximum position at 154.75.

The resolution of the sensor, which is technically the same as a pixel, is increased in the manner described above by approximately a factor of ten. The subpixel positions determined upon calibration are assigned to the wavelengths which correspond to the characteristic emission lines of chemical elements. If, for example, a certain line of the element aluminium is supposed to be measured, the intensity of the radiation is recorded in the range of the pixels which are arranged around the subpixel that has been assigned to this line during the base calibration. The spectrum drift processed here, for example caused by a thermal change in length of the detector, leads to the line being displayed on a different pixel by the optical apparatus of the spectrometer. The drift correction according to the present method then results in the intensity measured for a given pixel or subpixel being assigned by the correction to the subpixel of the emission lines known from the calibration and thus the correct intensity of the emission lines is measured in the maximum and not at a flank of the peak.

In order to carry out the method according to the invention, an optical spectrometer is initially provided which is fitted with a radiation source, with an optical apparatus, which splits up a spectrum into spectral lines according to wavelengths from the radiation, with a number of detectors, which in each case receive a partial spectrum and which are in each case fitted with a plurality of pixels to measure the radiation intensity of the partial spectrum falling on the detectors. The spectrometer has a base calibration such that the device-related accuracy can be achieved at a target temperature.

In addition, the spectrometer is fitted with a catalogue of spectral lines of different chemical elements which can be used as correction lines. This catalogue has been created from the spectrum obtained during the base calibration and stored in the control system of the spectrometer.

A measurement with evaluation and compensation of the spectrum drift occurring in this case comprises the following steps:

An emission spectrum of the unknown sample is produced by excitation e.g. by spark discharge and is split up in the spectrometer as the spectrum and focused on the detectors. The emission spectrum is then stored electronically by reading the detectors. Each individual detector receives a partial spectrum which is determined substantially by its extension and position on the focal curve.

The pixels which receive the maximum of the peaks for each partial spectrum are then determined and in each case a peak position is identified up to the subpixels for the peak maximums of the partial spectrums.

In a preferred embodiment of the method, the pixels, at which peak maximums have been measured, are determined by each spectrum of each detector. The peak maximums are determined as follows: A pixel intensity is a peak maximum in a local range when the value in this range, e.g. +/−6 pixels has the highest intensity. In addition, there is a threshold value for the minimum background-corrected peak intensity, e.g. 10,000 CPS (CPS=counts per second–intensity measured as the counting rate).

The positions of the subpixel maximums are determined from the peak maximums found within a spectrum. This can be carried out either by peak adaptation to a predefined peak profile, e.g. according to Gauß, Lorentz or Voigt or by maximum value search of a comparison polynomial with the measurement points as the supporting points.

The subpixel positions of the peak maximums are preferably determined for each recorded spectrum of a given detector in order to apply the drift correction for analysis samples in the same way as occurred once before with the calibration spectrums: Determination of the pixel position with the most frequent intensity in a predefined search range in consideration of a threshold value with subsequent determination of the subpixel position of the maximum.

It is advantageous for the symmetry of the peaks to also be assessed in this step since asymmetric peaks indicate spectral distortions. The ratio of peak flanks at a certain peak height serves as a measure for the symmetry of a peak, e.g. 10% of the maximum height. A value of 1.0 indicates a symmetric peak. Deviating values are increasingly more asymmetric. For the purpose of position determination, deviations up to e.g. +−0.2 of the ratio from the optimal value 1.0 are acceptable.

The peak at pixel position 1625 is shown in FIG. 4 as an example of a peak that is not suitable for the drift correction. This peak is asymmetric since it results from spectral interference of adjacent peaks. In order to be able to better identify this effect, a plurality of spectrums of samples with different element contents are shown in this illustration. The intensity ratios of the peaks are distinguished by the different composition and the influence of the spectral interference on the peak shape and also on the maximum position can be identified. The peaks in the left region are not spectrally distorted. These peaks are symmetric. In order to provide greater clarity of the peak maximum, the pixel intensities have been approximated by a cubic spline with a grid of 0.1 pixels.

An illustration of the symmetry determination of a peak is illustrated in FIG. 5. In this example, the peak flank ratio of the left peak flank to the right peak flank is 0.49 at 10% peak height. This peak is evaluated as an asymmetric peak and is unsuitable as a correction line for the drift correction.

The use of the drift correction when analysing a sample includes a comparison of the catalogue lines with the lines of the sample spectrum. In this case, the lines from the catalogue that are suitable for the respective sample are used individually. By comparing the target positions from the catalogue and the actual positions from the measurement of the analysis sample, a correction term for the pixel position can be calculated and applied. This step is carried out for each analysis.

A check is carried out for preferably each peak position of the partial spectrums to determine whether a correction line present in the catalogue is present within a predefined maximum distance from the respective peak position. If such a line is found, which is located remote for example at a distance of no more than +/−5 pixels from the actually measured peak, the distance of the peak position of the measured spectrum from the peak position of the adjacent correction line is determined.

An example is given to illustrate this method step. There are three potential measured peaks of an iron sample at positions 1897.50, 1910.01 and 1920.11 in the surrounding area for the catalogue line of iron base at pixel position 1908.16. The measured temperature at the time of the measurement of the iron sample was 5° C. The nominal temperature, at which the catalogue lines were determined, is 32.5° C. Due to the temperature difference, pixel drifts of up to 3 pixels should be expected. The position differences to the catalogue lines are 10.66, −1.85 and −11.95. Only the second peak at 1910.01 is located in the search range of, for example, 5 pixels. The catalogue line 1908.16 with drift −1.85 is thus selected for further processing.

In order to reduce incorrect assignments, only the lines, at which only one peak is located in the search range of the respective catalogue line, continue to be used.

It is initially assumed that the peak position of the measured spectrum and the correction line belong to the same physical wavelength of a characteristic emission spectrum of a chemical element. This distance calculation is carried out for a plurality of peaks, preferably at least five peaks of each detector.

Since dependent upon the sample composition of the unknown sample, which is to be analysed, not every catalogue line appears in the analysis spectrum and not every peak in the analysis spectrum corresponds to a catalogue line, the list of the assigned reference positions may still contain incorrect assignments, hereinafter referred to as outliers, which have not been intercepted by limiting the clarity in the search range. These outliers are identified by an outlier test and can then be removed.

Frequently used outlier tests such as Grubbs' test, the Dixon test or the Walsh test require an error probability as a parameter to identify outliers. In addition, outliers are no longer found in these methods with given error probability if a plurality of outliers are present in the number of random samples. The Walsh test requires a large sample size of more than 60 values.

For this reason, the method according to Iglewicz and Hoaglin is preferably used in the method according to the invention. (B. Iglewicz and D. C. Hoaglin, How to Detect and Handle Outliers (American Society for Quality Control, Milwaukee, Wis., 1993)) This method describes an outlier test which works even in the presence of a plurality of outliers and uses a limit value for the test variable instead of the formal error probability.

In this case, all values $$|z_i|>3.5$$

with $$z_i = \frac{x_i - med(x)}{MAD(x)}$$

and $$MAD(x) = 1.4826 med_i |x_i - med_j x_j|$$

are labelled as outliers. The function med(x) calculates the median of the x values. The factor 1.4826 applies to normal distributed data.

FIG. 6 shows a measurement of the spectrum drift of an iron sample and illustration of the pixel drifts found for assigned catalogue lines from a measured analysis spectrum of an iron sample. The iron sample was measured at 5° C.

The nominal temperature, at which the base calibration of the spectrometer has been carried out, is 32.5° C. The points illustrated as triangles constitute incorrect assignments which can be eliminated by an outlier correction.

A correction function for the assignment of the peak positions of the partial spectrums to the wavelengths of the measured emission spectrum is then calculated for each detector from the determined distances. The correction function is preferably a polynomial of at least second order. The different spectrum drift, which in practice is often greater from the centre of the detector towards the edge regions, can thus be approximated particularly well. Following the above-described elimination of the outliers, the drift values d(x), x=pixel can be adapted to a comparative polynomial $$d(x) = \sum_{j}^{m} a_j x^j$$

with m=order of the polynomial, aj=polynomial coefficients. Using this polynomial, the current pixel drift can be calculated for all pixel positions on the detector.

For edge regions of the detector, which are not located between two drift lines, drift values can be estimated as a constant continuation, i.e. the polynomial value is used as the drift value for the extrapolation range, at whose pixel position a drift line has recently been found.

FIG. 7 shows a representation of the pixel drift at the positions at which lines of the reference catalogue can be assigned to peaks in the measured spectrum of an iron sample. The iron sample was measured at 5° C. The nominal temperature is 32.5° C. Additionally, a second order comparative polynomial is indicated which can be used to interpolate pixel values in the entire pixel range. The pixels in the edge regions of the detectors can be calculated with the polynomial values at which the respectively last catalogue line could be assigned (not shown in the diagram).

The drift correction of a measured spectrum can be carried out by a cubic spline interpolation.

Since the pixel drift is defined as the difference of the target position of the corresponding catalogue line to the measured peak position of the analysis spectrum, drift-corrected pixel values Px as the sum of the respective pixel value and the drift were used as the x values of the supporting points for the spline which had been calculated from the drift correction polynomial.

$$P_x = x + d(x) = x + \sum_{j}^{m} a_j x^j$$

The measured pixel intensities are used as the y values of the supporting points:

$$I_x = I(x)$$

The drift-corrected intensity at a pixel position x can then be calculated as the functional value of the spline function at the point x.

Spectrums calculated in this manner can then be used for a concentration determination instead of uncorrected spectrums.

FIG. 8 shows an illustration of the drift correction. The spectrum illustrated by points corresponds to a drifted spectrum which has been recorded at 5° C. The spectrum illustrated by dashes corresponds to the drifted-corrected spectrum of the measurement at 5° C. As a comparison, a spectrum without a drift is illustrated with a solid line, said drift has been measured at the nominal temperature of 32.5° C. It can be discerned that the drift correction leads to a spectrum whose position substantially matches the measurement at the target temperature.

Lastly, it is illustrated in FIG. 9 how the drift correction affects the measured element concentrations of the sample. The comparison of concentration determinations of the chrome line at 313.2 nm of an iron sample without drift correction (white clouds) and with drift correction (shaded clouds) is illustrated in a temperature range of 5° C.-50° C. A concentration of 2.94 mass % at the nominal temperature of 32.5° C. has been determined without drift. The values prior to drift correction deviate significantly therefrom, while the values following drift correction are well matched to the target value.

The data of the chrome line has been measured using the detector, whose drift data have been used in the detailed description as an example. It can be seen in the diagram that the pixel drift is not constant for this detector at 5° C. The drift changes with the pixel position in a range of −1.8 to −2.8 pixels. An evaluation with the conventional online drift correction method would thus not be possible under the same conditions.

The new drift correction method is thus suitable for determining and correcting constant and non-constant pixel drifts for a spectral measurement of a sample on a detector. In this case, no separate measurement is required. No apparative devices are required for the drift detection and correction. All required data are determined from the analysis measurement and a line catalogue that was compiled once before.

The invention claimed is:

1. A method of compensating a spectrum drift in an optical spectrometer, the method including:

(a) providing the optical spectrometer, the optical spectrometer:
having a radiation source configured to generate characteristic radiation of chemical elements of an excited sample,
(b) having a spectrum splitter configured to split up a spectrum into spectral lines according to wavelengths from the characteristic radiation,
having a number of detectors configured, in each case, to receive a partial spectrum, and which are, in each case, provided with a plurality of pixels to measure a radiation intensity of the partial spectrum falling on the pixels, and
having a catalogue of spectral lines of different chemical elements for use as correction lines;
(c) generating and recording an emission spectrum of the sample;
determining the pixels which receive the respective peak maxima of the respective partial spectrums, and identifying, in each case, a respective peak position for the respective peak maxima of the respective partial spectrums;
(d) for each respective peak position of the respective partial spectrums:
checking whether a correction line is present within a predefined maximum distance from the respective peak position, and calculating a distance of the respective peak position of the measured spectrum from the peak position of the adjacent correction line in the case in which it is determined that a correction line is present within the predefined maximum distance from the respective peak position;

(e) calculating a correction function for assignment of the peak positions of the partial spectrums to the wavelengths of the measured emission spectrum; and
(f) creating the catalogue of spectral lines of different chemical elements, wherein creating the catalogue comprises:
  i. carrying out a base calibration for assignment of wavelengths of radiation, contained in peaks, of a plurality of the different chemical elements, to pixels of the detectors;
  ii. determining the pixels which receive the respective maxima of the peaks for each respective partial spectrum;
  iii. identifying, in each case, a respective peak position for the respective peak maxima of the partial spectrums; and
  iv. creating a correction line catalogue by selecting and storing peaks that have minimum distances from adjacent peaks, and which are symmetrical with respect to their respective positions.

2. The method according to claim 1, wherein at least three correction lines are stored in the catalogue for each detector.

3. The method according to claim 1, the method further including checking, prior to element (e), for outliers on the identified distances of the peak positions of the measured spectrum from the peak positions of the adjacent correction lines, wherein outliers do not enter into the calculation of element (e).

\* \* \* \* \*